S. W. Adwen.
Hay Bale.

No. 91,057. Patented Jan. 8, 1869.

Witnesses:
R. F. Osgood
Quincy VanFoorhis

Inventor:
S. W. Adwen
By J. Fraser & Co.
Attys

United States Patent Office.

STEPHEN W. ADWEN, OF ROCHESTER, NEW YORK.

Letters Patent No. 91,057, dated June 8, 1869.

IMPROVEMENT IN BALING SHORT-CUT HAY AND STRAW.

The Schedule referred to in these Letters Patent and making part of the same.

*To all whom it may concern:*

Be it known that I, STEPHEN W. ADWEN, of Rochester, in the county of Monroe, and State of New York, have invented a certain new and useful Improvement in Baling Short-Cut Hay and Straw; and I do hereby declare that the following is a full and exact description thereof, reference being had to the accompanying drawings, making part of this specification.

Figure 1:
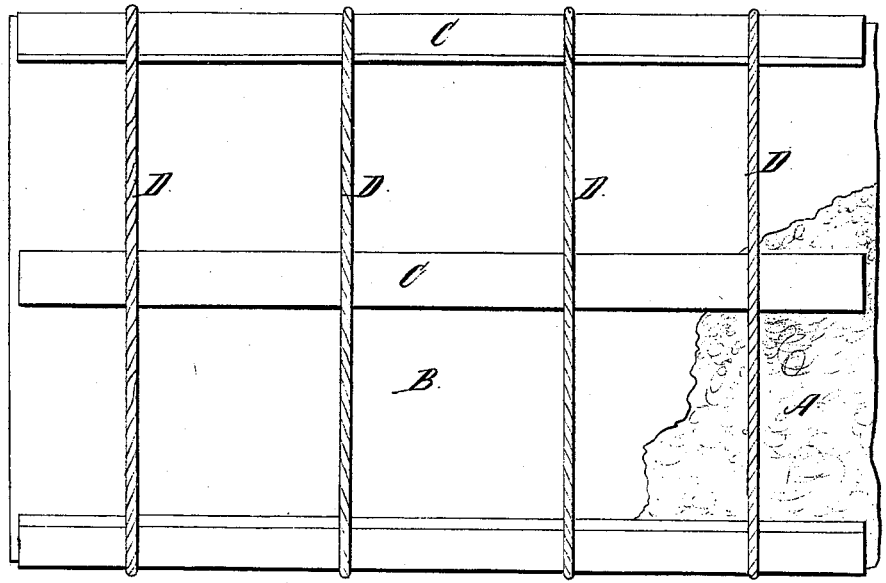

Figure 1 is a plan of a bale of hay baled in my improved manner.

Figure 2:
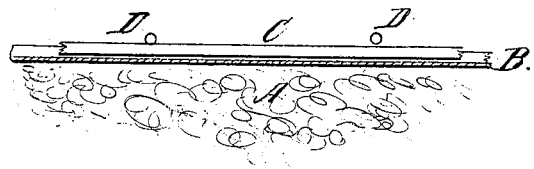

Figure 2, section of a portion thereof.

Like letters of reference indicate corresponding parts in both figures.

My invention consists in the employment, in baling short-cut hay and straw, of paper sheets combined with stiffening-laths, or slats, for enveloping and holding the bale in form.

In the drawings—

A indicates the bale of hay or straw, cut fine, in condition for use, and compressed in form in the usual manner.

This bale is covered with sheets of heavy and strong paper B, and longitudinally over these are placed laths or slats C C, at suitable distances apart, and the whole is bound in place by the usual cords D D.

In long hay there is no difficulty in baling, for the reason of the adhesion and intermingling of the straws. In short-cut, however, in order to keep the material together, it is necessary in baling to provide an outer covering, or envelope. The only covering heretofore employed, so far as I am aware, is long straw, held by cords or hoops, but having no slats or stiffeners, as shown in the patent to Charles Brown, dated August 27, 1867, No. 68,282.

In the use of straw there are some difficulties which it is desirable to obviate. It is difficult to spread it equally, so as to perfectly enclose the short-cut material, especially when subject to the action of the press, and, therefore, the contents of the bale are liable to escape. By constant handling and rough usage, the covering is liable to separate, and thus allow escape. The straw is also liable to catch and pull out, and thus disturb the whole covering.

In cities, where most baling is done, it is difficult to obtain a supply of long straw; furthermore, the use of straw, without stiffeners, or slats, gives but little strength or endurance to the bale under rough handling and transportation.

I propose a remedy, by the employment of the paper, as before described, combined with the stiffeners. Paper, with a very great degree of strength, can be furnished at much less cost than straw, and in cities is always readily obtained, as it is an article of commerce.

It perfectly encloses the material of the bale, so that there can be no escape. Its strength is such (protected and shielded by the stiffeners) that it cannot easily tear or wear, qualities that recommend it specially for use in baling. It adds no appreciable weight or material to the bale.

The stiffeners or laths are an indispensable adjunct of the paper, since they serve, not only to shield and protect it, but also to hold it extended in place, and also to give a degree of stiffness and form to the bale itself. I believe, however, that the paper alone, with the binding-cords, would be far more effective than straw.

I am aware that long straw has been used in baling short-cut feed on the outside of the bale, to prevent the escape of the contents; but as this forms no part of my invention, I do not wish to claim its use.

What I claim as my invention, and desire to secure by Letters Patent, is—

As a new article of manufacture, a bale of short-cut feed enclosed in paper B, and retained in a compressed state by means of slats C and binders D, substantially as described.

In witness whereof, I have hereunto signed my name in the presence of two subscribing witnesses.

STEPHEN W. ADWEN.

Witnesses:
  R. F. OSGOOD,
  W. H. ADWEN.